Oct. 6, 1953 P. D. BECKER 2,654,113
CASTER
Filed Nov. 4, 1950

INVENTOR:
PHILIP D. BECKER,
By Robert E Ross
AGENT.

UNITED STATES PATENT OFFICE 2,654,113

CASTER

Philip D. Becker, Hingham, Mass., assignor to United-Carr Fastener Corporation, Cambridge, Mass., a corporation of Massachusetts Application November 4, 1950, Serial No. 194,081

4 Claims. (Cl. 16—42)

This invention relates generally to casters, and has particular reference to a caster for assembly onto the head of a bolt or the like.

The object of the invention is to provide a caster which is adapted for frictional non-snapping engagement with a bolt head.

A further object of the invention is to provide a push-on caster for assembly onto a bolt head, in which spring arms on the caster are so constructed for frictional engagement with the bolt that the force required for disengagement of a bolt head from the caster is considerably greater than that required for assembly of the bolt head into the caster.

A still further object of the invention is to provide a push-on caster having spring arms with bolt head-engaging surfaces disposed thereon in which the spring arms are so constructed as to allow both lateral and vertical movement of the engaging surfaces during insertion and removal of a bolt head.

Other objects of the invention will, in part, be obvious, and will, in part, appear hereinafter.

Figure 1:
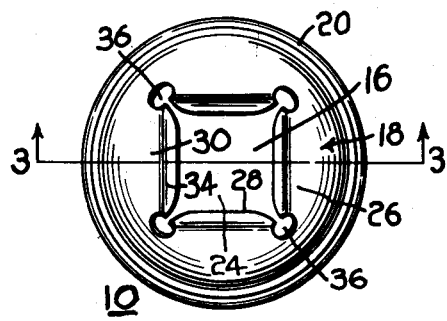
Fig. 1 is a top plan view of a caster embodying the features of the invention.
Figure 2:
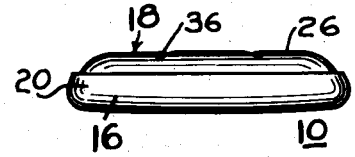
Fig. 2 is a view in elevation of the caster of Fig. 1.
Figure 3:
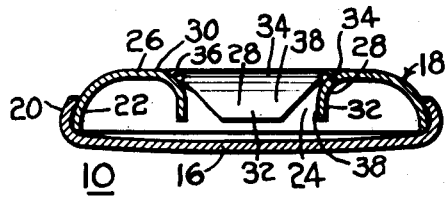
Fig. 3 is an enlarged view in section taken on on line 3—3 of Fig. 1.
Figure 4:
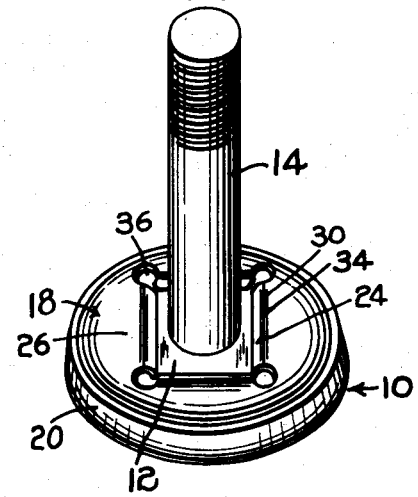
Fig. 4 is a perspective view of the caster of Fig. 1 with a bolt assembled therewith.
Figure 5:
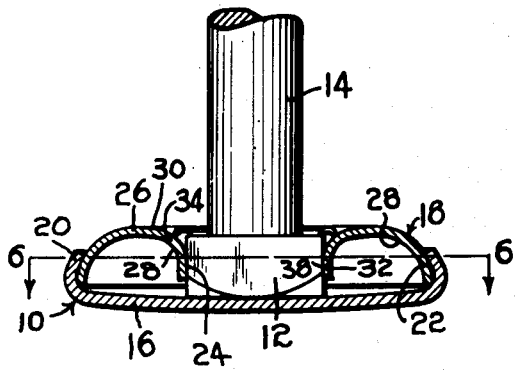
Fig. 5 is a view in elevation, partly in section of the assembly of Fig. 4.
Figure 6:
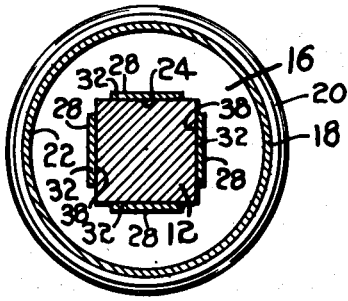
Fig. 6 is a view in section taken on line 6—6 of Fig. 5.

Referring to the drawing, there is illustrated a caster 10, which is adapted for assembly onto the head 12 of a bolt 14 or the like, to provide a broad bearing area to support downward loads applied to the bolt.

The caster 10 comprises a base 16, which is preferably formed of relatively thick sheet metal, and an attaching member 18, which is formed of resilient sheet metal and is substantially thinner than the base. The base 16 is provided with an upwardly and inwardly turned peripheral portion 20, and the attaching member is provided with a depending rim 22 which is disposed within the periperal portion 20 of the base and retained therein against the base 16. The attaching member 18 has a central opening 24 which, in the illustrated embodiment, is substantially square to conform to the shape of the bolt head 12 to be inserted therein. The attaching member 18 is dome-shaped, with a central portion 26 surrounding the opening 24 being substantially parallel to the base. To provide means for frictional engagement with the bolt head, a series of spring arms 28 are provided, which are integral with the central portion 26 and are disposed on opposite sides of the opening 24 to engage the bolt head 12 on opposite sides thereof.

The construction of the spring arms is a critical factor in insuring proper operation of the device. In the illustrated embodiment, the arms 28 have a horizontal portion 30 which extends into the opening a substantial distance, and a free end portion 32 which extends downwardly toward the base and terminates in spaced relation thereto. The horizontal portion 30 and the free end portion 32 are connected by a downwardly curved portion 34 to provide a lead-in for insertion of the bolt head as will be hereinafter described. To prevent cracking of the metal of the center portion of the attaching member by fatigue from frequent insertion and removal of the bolt head, openings 36 are provided in the corners of the opening between adjacent arms, and the openings 36 also decrease the width of the horizontal portion of the spring arms at the junction with the central portion of the attaching member for a purpose to be hereinafter described.

The free ends 32 have flat inner surfaces 38 for frictional engagement with the sides of the bolt head, and the free ends are capable of outward flexing to increase the distance between opposite engaging surfaces to accommodate an inserted bolt head. The horizontal portions 30 are also required to be vertically flexible independent of the flexing of the free ends. Since the horizontal portions are relatively short, and a predetermined amount of flexing thereof is required for proper operation of the device, the required flexing is obtained by the decrease in width of the horizontal portion at the junction with the center portion which is the point at which the greatest bending moment occurs during flexing.

The bolt head is assembled into the caster by simply pushing the head into the opening 24, so that the surfaces 38 frictionally engage the sides of the bolt. During such insertion, the free ends 32 flex outwardly to adjust themselves to the size of the bolt head and press tightly against the sides thereof to retain the parts in assembly. During insertion, the horizontal portion also flexes downwardly toward the base by reason of the drag of the bolt head on the surfaces 38 and is retained in the downward position while the downward flexing of the horizontal portion, which is independent of the flexing of the free ends, tends to move the free ends downwardly and outwardly, since the entire spring arm is pivoting about the junction with the central portion of the attaching member, and decreases the pressure required to force the bolt head into the opening.

When removal of the bolt from the caster is attempted, an opposite effect occurs. When the bolt head moves upwardly, the frictional drag of the surfaces 38 tends to flex the horizontal portion 30 upwardly away from the base, which tends to also move the free ends upwardly and inwardly, thereby tending to increase the frictional engagement with the bolt head.

Thus it is seen that the construction of the spring arms allows easy insertion of the bolt into the caster, but permits removal thereof only by the application of a disengaging force considerably greater than that required for insertion.

As an example of a particular embodiment of the invention, a caster was constructed having a base formed of sheet metal .040 inch thick, and an attaching member formed of spring tempered steel having a thickness of .020 inch, to receive a bolt having a square head $\frac{9}{16}$ inch wide. It was found that fifteen pounds pressure was required to insert the bolt head into the caster, but over thirty pounds pressure was required to remove the bolt.

Although in the illustrated embodiment, the caster is designed to accommodate bolts having square heads, it will be obvious that casters may be constructed to receive bolts having other head shapes.

Since certain other obvious modifications may be made in the device without departing from the scope of the invention, it is intended that all matter contained herein be interpreted in an illustrative and not a limiting sense.

I claim:

1. A caster, comprising a base and an attaching portion joined to the base and having a medial portion overlying the base in spaced relation thereto, said attaching portion having a central opening to receive the head of a bolt or the like and a series of spring arms extending from the attaching portion about the opening, said spring arms extending a substantial distance into the opening and then being turned downwardly to form bolt head engaging portions which are substantially normal to the base, said bolt head engaging portions having inner shoulderless flat faces to frictionally engage the sides of an inserted bolt head, said portion of the arms extending into the opening being flexible to allow vertical movement of said bolt head engaging portions during insertion and withdrawal of the bolt head.

2. A caster, comprising a base and an attaching portion joined to the base and having a medial portion overlying the base in spaced relation thereto, said attaching portion having a central opening to receive the head of a bolt or the like and pairs of opposing spring arms depending from the attaching portion in the opening, said spring arms extending a substantial distance into the opening and then downwardly to form shoulderless free end portions having inner flat faces to frictionally engage the sides of an inserted bolt head, said portion of the arms extending into the opening being flexible to permit vertical movement of said free end portions during insertion and withdrawal of the bolt head so that during insertion downward flexing of said portion causes the distance between the faces of opposing pairs of arms to increase, and during withdrawal upward flexing of said portion causes the distance between faces of opposing pairs of arms to tend to decrease to more tightly engage the sides of the bolt head.

3. A push-on caster, comprising a base and an attaching portion joined to the base and having a medial portion overlying the base in spaced relation thereto, said attaching portion having a central opening to receive the head of a bolt or the like and a series of spring arms disposed about the opening, said arms having portions extending into the opening which are substantially parallel to the base and are capable of flexing toward and away from the base and free end portions turned downwardly to extend at right angles thereto toward the base and having inner flat engaging surfaces to frictionally engage the sides of an inserted bolt head, said free end portions being capable of flexing toward and away from each other whereby said engaging surfaces are capable of movement both laterally and vertically in relation to the base.

4. A caster, comprising a base and an attaching member assembled on the base, said base having an upwardly and inwardly turned peripheral portion, said attaching member being formed of resilient sheet metal and having a depending outer rim disposed within the peripheral portion of the base and retained thereby, a center portion having an opening to receive the head of a bolt or the like, said center portion being disposed in spaced relation to the base, and having a series of spring arms disposed about the opening, said arms extending a substantial distance into the opening parallel to the base and then downwardly, and terminating in free end portions which are substantially normal to the base, said free end portions being movable in a direction vertical to the base and having opposing faces adjacent opposite sides of the opening which are adapted to frictionally engage opposite sides of an inserted bolt head.

PHILIP D. BECKER.

References Cited in the file of this patent

UNITED STATES PATENTS

| Number | Name | Date |
|---|---|---|
| 761,508 | Kroder | May 31, 1904 |
| 1,347,720 | Smith | July 27, 1920 |
| 1,382,833 | Hurd | June 28, 1921 |
| 1,405,994 | Fisher | Feb. 7, 1922 |
| 1,659,540 | Larsen | Feb. 14, 1928 |
| 1,834,871 | Rosenberg | Dec. 1, 1931 |

FOREIGN PATENTS

| Number | Country | Date |
|---|---|---|
| 6,505 | Great Britain | of 1913 |